United States Patent [19]

Ibental et al.

[11] Patent Number: 5,469,217
[45] Date of Patent: Nov. 21, 1995

[54] ARRANGEMENT FOR DOUBLING THE FIELD FREQUENCY OF A PICTURE SIGNAL

[75] Inventors: Achim Ibental, Elmshorn; Martin Dammann, Sparrieshoop, both of Germany

[73] Assignee: U.S. Philips Corporation, New York, N.Y.

[21] Appl. No.: 146,287

[22] Filed: Oct. 28, 1993

[30] Foreign Application Priority Data

Nov. 4, 1992 [DE] Germany .................. 42 37 225.9

[51] Int. Cl.⁶ ................................................ H04N 7/01
[52] U.S. Cl. ................... 348/447; 348/910; 348/443
[58] Field of Search ............................ 348/447, 910, 348/440, 443, 448; H04N 7/07

[56] References Cited

U.S. PATENT DOCUMENTS

| | | | |
|---|---|---|---|
| 4,603,351 | 7/1986 | Vreeswijk et al. | 348/447 |
| 4,701,793 | 10/1987 | den Hollander et al. | 348/447 |
| 4,996,595 | 2/1991 | Naito et al. | 348/447 |

OTHER PUBLICATIONS

A. Ibenthal et al., "Motion compensated 100 Hz Conversion", Philips Components, Internal Laboratory Report.

*Primary Examiner*—James J. Groody
*Assistant Examiner*—Glenton B. Burgess
*Attorney, Agent, or Firm*—Michael E. Marion

[57] ABSTRACT

In an arrangement for converting an original picture signal representing a sequence of frames, each of which is composed of two interlaced fields, into a converted picture signal which has a double field frequency with respect to the original picture signal, is for doubling the field frequency, for the purpose of noise reduction, motion compensation and line flicker reduction, a memory arrangement (1, 2) provided for doubling the field frequency, which memory arrangement precedes a motion compensation arrangement (5) whose output signal is applied to a noise reduction arrangement (6), and a line flicker reduction arrangement (7) is provided which receives the output signals from the noise reduction arrangement (6) and the motion compensation arrangement (5), while the converted picture signal is obtained from the output signal of the noise reduction arrangement (6), the line flicker reduction arrangement (7) or the motion compensation arrangement (5), dependent on the position with respect to time of a field to be generated of the converted picture signal.

13 Claims, 6 Drawing Sheets

| | | | | | | |
|---|---|---|---|---|---|---|
| Y$_{50}$ | A1 | | B1 | | A2 | |
| FM1 in | A1 | | B1 | | A2 | |
| FM1 out | BO | A1 | B1 | B1 | A2 | — |
| FM2 in | BO$_{NR}$ | — | A1$_{NR}$ | — | B1$_{NR}$ | — |
| FM2 out | AO$_{NR}$ | BO$_{NR}$ | BO$_{NR}$ | A1$_{NR}$ | A1$_{NR}$ | B1$_{NR}$ |
| Y$_{100}$ | BO$^*_{100}$ | BO$^+_{100}$ | A1$_{100}$ | B1$^-_{100}$ | B1$^*_{100}$ | B1$^+_{100}$ |

Fig. 2

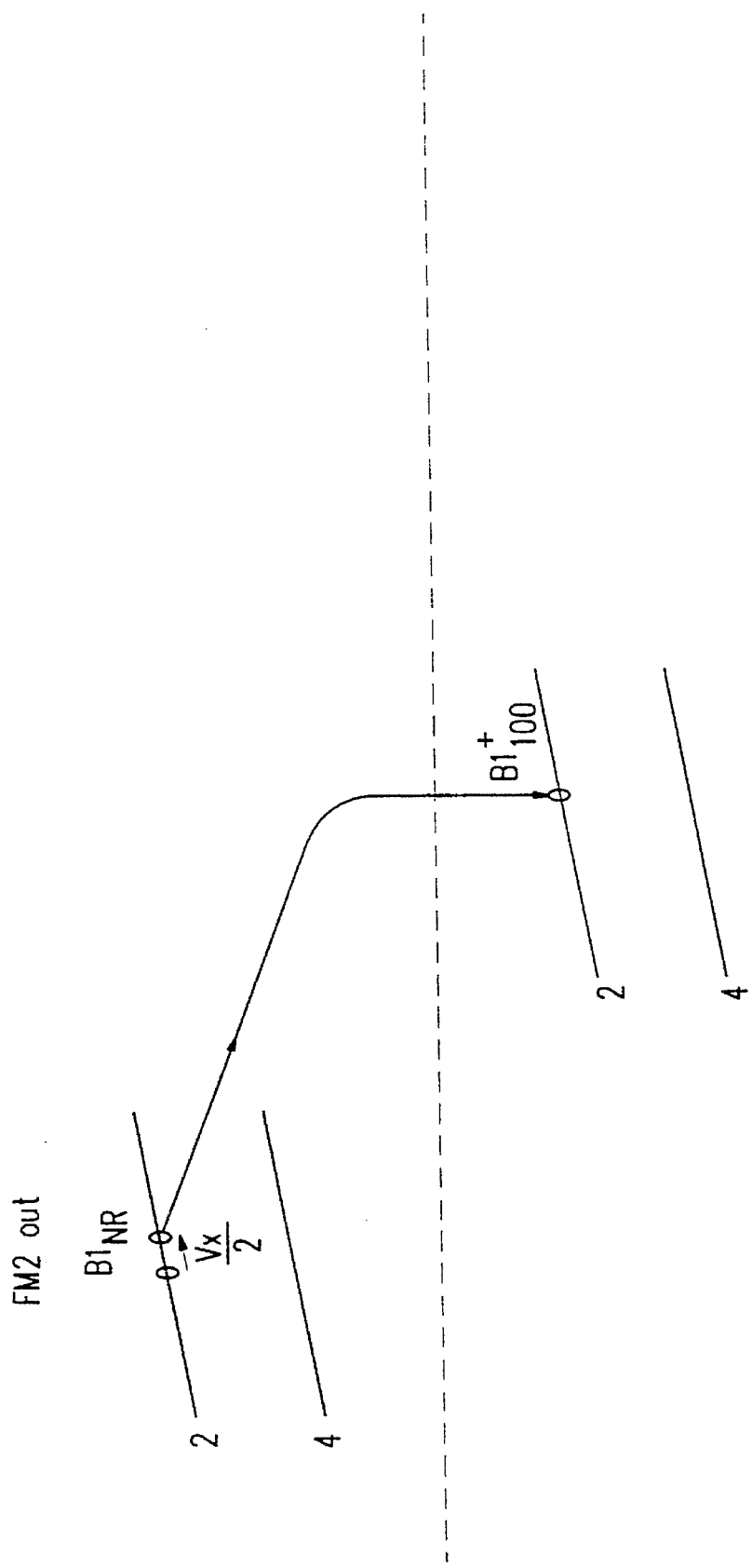

ARRANGEMENT FOR DOUBLING THE FIELD FREQUENCY OF A PICTURE SIGNAL

BACKGROUND OF THE INVENTION

The invention relates to an arrangement for converting an original picture signal representing a sequence of frames, each of which is composed of two interlaced fields, into a convened picture signal which has a double field frequency with respect to the original picture signal.

When converting a picture signal into such a converted picture signal which, with respect to the original picture signal, has a double field frequency, there is the problem that every second field of the converted picture signal must be newly generated, because no corresponding field of the original picture signal is available with respect to time and also with respect to the picture information.

In simple arrangements for doubling the field frequency, every field is doubled. A moving object in the fields of the converted picture signal is imaged twice in the same position before it jumps to the next position in the two subsequent fields. Since the human eye cannot follow these jumps, it is incident on the average speed of motion and observes a moving object from field to field at different positions. This leads to a double structure and motion blurr.

In other arrangements for field doubling of a picture signal a motion compensation is therefore provided by means of which the motion between two fields of the original picture signal is determined so that the motion can be taken into account in fields of the converted picture signal to be generated therebetween as a function of time and a corresponding interpolation can be performed. However, such arrangements have the further problem that possibly present noise is also to be reduced and that the line flicker, which still occurs in spite of the doubling of the field frequency in picture signals generated by way of interlaced scanning, is to be reduced. In the state of the art arrangements are only known in which a motion compensation is combined either with a noise reduction or with a line flicker reduction.

SUMMARY OF THE INVENTION

It is an object of the invention to provide an arrangement in which the motion of the picture contents during generation of the compensated fields is taken into account when converting the picture signal into a converted picture signal at the double field frequency, and which moreover allows a noise reduction of the picture signal and a line flicker reduction.

According to the invention this object is solved in that for doubling the field frequency a memory arrangement is provided which precedes an arrangement for motion compensation whose output signal is applied to an arrangement for noise reduction, in that an arrangement for line flicker reduction is provided which receives the output signals from the noise reduction arrangement and the motion compensation arrangement and in that the converted picture signal is obtained from the output signal of the noise reduction arrangement, the line flicker reduction arrangement or the motion compensation arrangement, dependent on the position with respect to time of a field to be generated of the converted picture signal.

The actual the field frequency doubling is obtained by means of a memory arrangement. Consequently, the fields of the original picture signal are repeated at the double frequency so that a double field frequency is realized. However, this signal still has the above-mentioned errors.

An arrangement for motion compensation is therefore provided, which arrangement determines motions in the original picture signal and, with reference to the known motions, allows a compensation of this motion in the new fields to be generated of the compensated signal.

The arrangement for motion compensation precedes an arrangement for noise reduction which combines the data of two consecutive fields for the purpose of noise reduction.

Furthermore, an arrangement for line flicker reduction is provided which receives the output signals from the motion compensation arrangement and the output signals from the noise reduction arrangement.

The output signal of the arrangement, i.e. the converted picture signal of the double field frequency, is obtained from the output signal of one of said three arrangements in dependence upon the position with respect to time of a field to be generated of the converted picture signal. This alternation between the output signals of the arrangements is advantageous because different errors occur, dependent on the position with respect to time of the fields of the converted picture signal. In some fields a motion compensation is required because these fields occur with respect to time between two fields of the original picture signal. This is not required for those fields which coincide with pictures of the original picture signal. The line flicker reduction is in its turn only required for those fields which as a consequence of the interlaced scanning method do not have the correct vertical position as compared with the fields of the original picture signal from which they are generated.

The arrangement according to the invention thus offers a combination of motion compensation with line flicker reduction and noise reduction.

An embodiment of the arrangement is characterized in that the original picture signal is written into a first field memory from which it is read at the double frequency, each field being consecutively read twice, and in that a second field memory is provided into which each field read for the second time from the first field memory is written after it has passed through the noise reduction arrangement.

The first field memory is thus used for doubling the field frequency. Each field written into this memory is read twice consecutively. A second field memory already operates at this double field frequency at the input side, because each field, which was read from the first field memory for the second time and has passed through the noise reduction arrangement, is written into this second field memory. After this noise-reduced field has been written into the memory, it is available at the output of the second field memory.

Consequently, two fields of the original picture signal, however, with a doubled field frequency are available at the outputs of the two field memories for the motion compensation arrangement. One of these fields is already noise-reduced, which simplifies the determination of motion by the motion compensation arrangement.

A further embodiment of the invention is characterized in that the two field memories precede a line memory which buffers a picture line of one of the output signals of the two fields. For one of the fields information of two consecutive picture lines is thus time-parallel available, which is advantageous for the subsequent line flicker reduction.

In a further embodiment of the invention the arrangement for line flicker reduction may advantageously be a median filter whose output supplies that input signal which has the middle amplitude value of the input signals.

In accordance with a further embodiment of the invention the arrangement for motion compensation receives the output signals of the two field memories and the line memory, which motion compensation arrangement determines a motion vector from the two consecutive fields of the original picture signal read from the field memories, which motion vector indicates the motion between the two fields for a group of pixels of these fields.

This motion vector may be used for motion compensation in those fields of the converted field signal which occur with respect to time between two fields of the original picture signal.

A further embodiment of the invention is characterized in that the arrangement generates a sequence of four fields $(A1_{100}, B1^-_{100}, B1^*_{100}, B1^+_{100})$ of the converted picture signal corresponding to two fields of a frame of the original picture signal, the first field $(A1_{100})$ of the sequence being obtained from the output signal of the noise reduction arrangement, the second and third fields $(B1^-_{100}, B1^*_{100})$ of the sequence being obtained from the output signal of the line flicker reduction arrangement and the fourth field $(B1^+_{100})$ of the sequence being obtained from the motion compensation arrangement.

As a consequence of the doubled field frequency of the converted picture signal, four fields of the converted picture signal must be generated in a time range in which two fields of the original picture signal are present. These two fields of the original picture signal and the four fields of the corresponding sequence of the converted picture signal will hereinafter be referred to as corresponding fields and corresponding sequence, respectively.

The first field of the sequence is obtained from the output signal of the noise reduction arrangement. This is possible because this first field of the sequence has the right position with respect to time and location as compared with the first corresponding field of the original picture signal and because only a noise reduction is to be performed.

The second and third fields of the sequence are obtained from the output signal of the line flicker reduction arrangement, because the two fields of the original picture signal must be utilized for these two fields, at least one of which does not have the correct position with respect to time and neither has the correct vertical position due to the interlaced scanning method used.

The signal for the fourth field of the sequence is obtained from the motion compensation arrangement, because this signal can only be obtained from the second corresponding field of the original picture signal due to use of motion compensation.

The further sub-claims state how the arrangement advantageously generates the four fields for the sequence of convened picture signals from the corresponding two fields of the original picture signal.

These and other aspects of the invention will be apparent from and elucidated with reference to the embodiments described hereinafter.

BRIEF DESCRIPTION OF THE DRAWINGS

FIG. 2 shows a Table of the fields written into and read from the memory arrangement according to FIG. 1, FIG. 6 is a representation, corresponding to FIG. 3, of the fourth field of the sequence.

DETAILED DESCRIPTION OF THE PREFERRED EMBODIMENTS OF THE INVENTION

Figure 1:
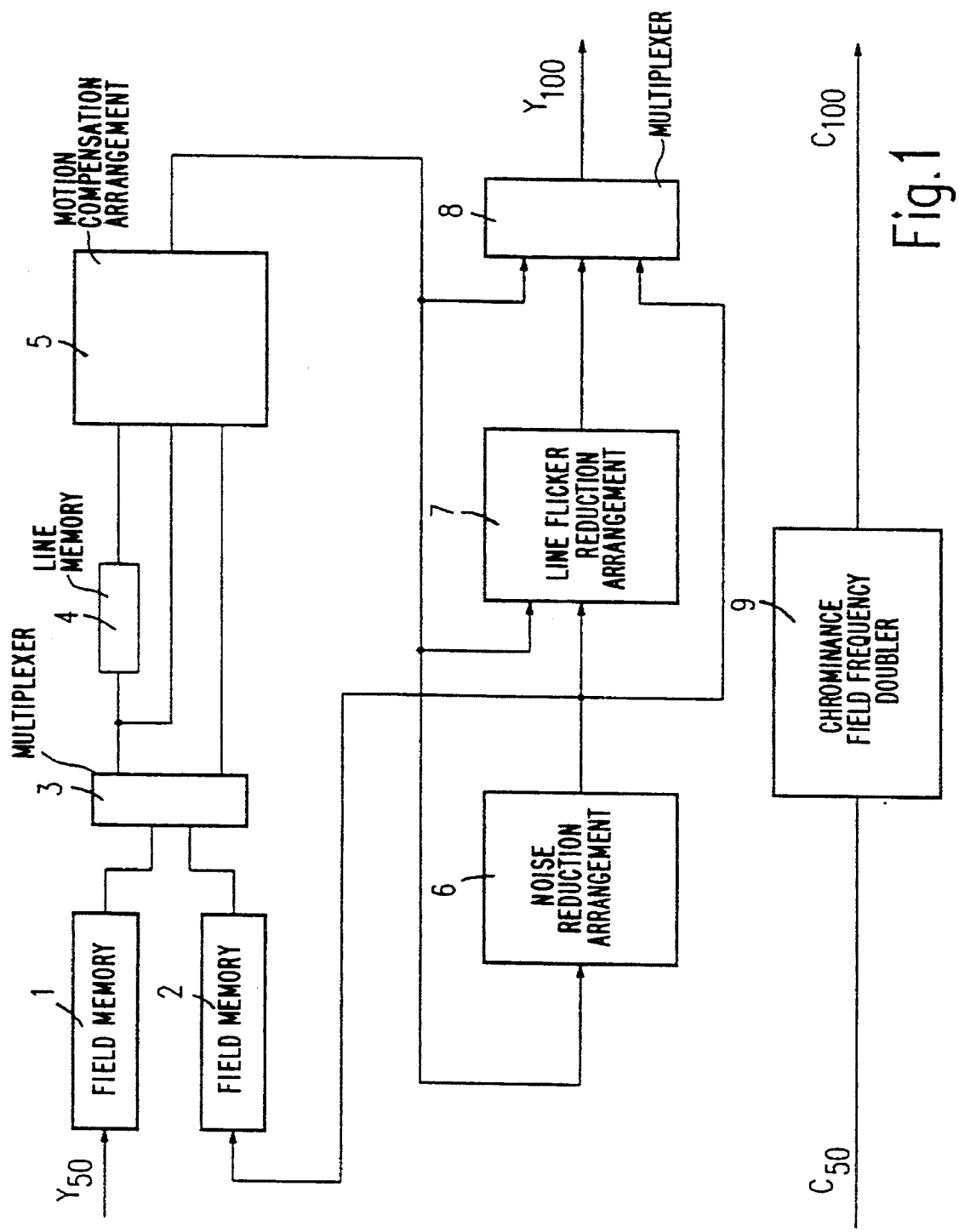
FIG. 1 shows a block diagram of the arrangement according to the invention for converting an original picture signal into a converted picture signal of the double field frequency.

FIG. 1 shows a block diagram of the arrangement according to the invention, which arrangement allows the field frequency of an original picture signal to be doubled and thus generates a converted picture signal, which generated picture signal is noise-reduced, and which performs, if necessary, a motion compensation and a line flicker reduction for the fields.

The arrangement of FIG. 1 is divided into two blocks, the first block processing the received luminance signal component $Y_{50}$ of the original picture signal and the second block processing the received chrominance signal component $C_{50}$ of the original picture signal. In the embodiment shown in FIG. 1 the chrominance signal is doubled only with respect to its frequency. The special procedures of noise reduction and line flicker reduction are performed only for the luminance signal in the embodiment shown in FIG. 1. However, it is alternatively possible to take these measures both for the luminance signal and for the chrominance signal.

In the arrangement shown in FIG. 1 the luminance signal component $Y_{50}$ of the original picture signal is applied to a first field memory 1 by means of which the field frequency of this signal is doubled. Each field of the original picture signal written into the field memory 1 is subsequently read twice. This reading process is performed at the double frequency. A simple doubling of the field frequency is thus already performed. However, the output signal of this field memory is only suitable for display if motion disturbances and line flicker are accepted. Furthermore, a second field memory 2 is provided whose input receives field signals to be described hereinafter, which signals already have the double field frequency. The signals of two consecutive fields of the original picture signal are parallel available at the outputs of the two field memories 1 and 2, which fields have already been doubled in field frequency.

The two field memories 1 and 2 are followed by a multiplexer 3 allowing one of the output signals of the field memories 1 and 2 to be alternatively applied to a line memory 4. The output signals of the two field memories 1 and 2 are applied to a motion compensation arrangement 5 via the multiplexer 3. The arrangement 5 thus receives the signals of the two field memories 1 and 2 and hence two consecutive fields of the original picture signal whose field frequencies have already been doubled. By using the line memory 4, the values of two pixels of the same line position of consecutive picture lines are simultaneously available for one of the two field signals.

The motion compensation arrangement 5 determines, from the two fields apply thereto, a motion which is present in the picture contents between these two fields. Advantageously, a motion vector indicating the motion between the two fields for a group of pixels is obtained from this determined motion for a group of pixels. The motion compensation arrangement 5 can determine this motion both in the horizontal direction and in the vertical direction, i.e. in the line direction as well as in the direction perpendicular to the lines. However, the motion may exclusively be determined in the line direction, which is much easier to realise in the circuit construction and also yields good results.

The arrangement shown in FIG. 1 also includes a noise reduction arrangement 6. This arrangement 6 may operate in known manner in which it combines the signals of pixels of the same location in consecutive fields. These signals are applied from the arrangement 5 to the arrangement 6. Since the arrangement 5 has already determined the corresponding motion vector, the noise reduction in the arrangement 6 can already be performed with motion-compensated signals.

The output signal of the noise reduction arrangement 6 is applied to the input of the second field memory 2, to an input of a line flicker reduction arrangement 7 and to a first input of a multiplexer 8. A signal which is already noise-reduced is thus written into the field memory 2 at the input side, which signal corresponds to that field which is read from the first field memory 1 for the second time already.

The line flicker reduction arrangement 7 which may be, for example a median filter and which selects, from the signals applied thereto, the signal with the middle instantaneous amplitude value, not only receives the output signal from the arrangement 6 but also the output signal from the motion compensation arrangement 5, because this output signal also contains the motion-compensated output signal of the line memory 4. This is necessary because a vertical interpolation must be performed for the line flicker reduction and consequently the pixels corresponding to the signals of two lines should be available, i.e. pixels of the same location in their line.

The line flicker reduction arrangement 7 not only receives these signals of two successive picture lines of a field from the arrangement 6 but also the signal of another field. In a manner to be described hereinafter a median filtering of these signals is performed, which leads to a line flicker reduction.

The output signal of the line flicker reduction arrangement 7 is applied to a second input of the multiplexer 8. A third input of the multiplexer 8 receives the output signal from the noise reduction arrangement 5.

At the output, the multiplexer 8 supplies the luminance signal $Y_{100}$ which represents the converted picture signal and which has a doubled field frequency as compared with the input signal $Y_{50}$. In a manner to be described hereinafter, the multiplexer 8 is switched between its three inputs dependent on the field to be generated.

FIG. 1 further shows a circuit block 9 in which the field frequency of the chrominance signal component $C_{50}$ of the original picture signal is doubled. This can be effected in the same way as for the luminance signal but alternatively, the field frequency may be doubled only. At the output, the unit 9 supplies the chrominance signal component of the converted picture signal.

FIG. 2 shows a Table indicating diagrammatically which fields are written into or read from the field memories 1 and 2 shown in FIG. 1.

Two consecutive fields of the original picture signal are denoted by A1, B1 and A2, B2, etc. in an unchanged form. Two fields having the same cipher form part of a frame. The two fields are generated in accordance with the interlaced scanning method.

As is shown in the Table of FIG. 2, for example two fields A1 and B1 of a frame of the original picture signal are written into the field memory 1 of FIG. 1, which field memory is denoted by FM1 in FIG. 2. Each of these two fields is subsequently read twice from the field memory 1, which reading is effected at the double frequency so that the field frequency of these pictures is already doubled.

If a field is read from the first field memory 1 for the second time, this signal reaches the input of the field memory 2 denoted by FM2 in the Table of FIG. 2, after it has passed through the arrangement 5 and the arrangement 6 of FIG. 1. At the next reading step of the field memories 1 and 2, two fields whose field frequencies have already been doubled are available at their outputs. As one of the fields, viz. the field written into the field memory 2 has already passed through the noise reduction arrangement, this field is already noise-reduced which is denoted by NR in the Table of FIG. 2.

The result is that two fields from the original picture signal having an already doubled field frequency are available at the outputs of the field memories 1 and 2 in FIG. 1.

It will now be explained with reference to FIGS. 3 to 6 how the four fields $A1_{100}, B1^-_{100}, B1^*_{100}$ and $B1^+_{100}$ of the output signal $Y_{100}$ as shown in the Table of FIG. 2, which are the signals of the multiplexer 8 as shown in FIG. 1, are obtained. These four fields are hereinafter assumed to be associated with a sequence. A frame of the original picture signal or two fields of this signal, viz. the fields A1 and B1 correspond to this sequence. The four fields of the sequence will hereinafter be assumed to correspond to these two fields of the original picture signal.

Figure 3:
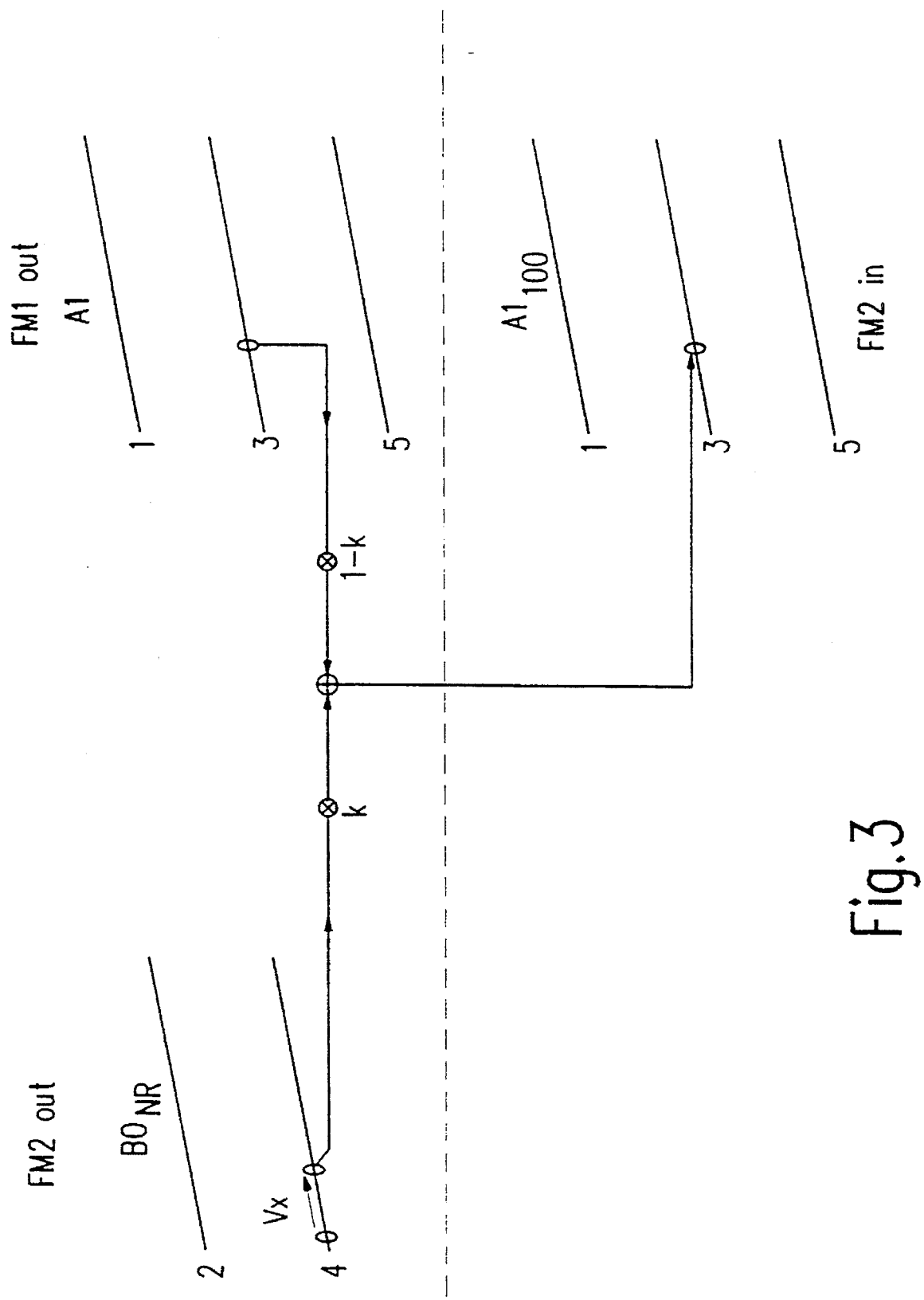
FIG. 3 shows a diagram in accordance with which the arrangement of FIG. 1 generates the first field of a sequence of the converted picture signal.

FIG. 3 shows diagrammatically, above a broken line, two fields $B0_{NR}$ and A1 of the original picture signal read from the two field memories 1 and 2 of FIG. 1. Below the broken line, a field $A1_{100}$ is shown which represents the first field of a sequence of the converted picture signal. This signal of the field $A1_{100}$ is to be generated by the arrangement of FIG. 1.

To this end the output signal of the first field memory 1 is used, from which field memory the field A1 of the original picture signal (at the doubled field frequency) is read. The field B0 of the original picture signal was already previously written in a noise-reduced form into the field memory 2. At the output, this signal is now available as signal $B0_{NR}$ at the output of the second field memory simultaneously with the signal A1. The first field $A1_{100}$ of the sequence is obtained from these two output signals of the field memories 1 and 2 in accordance with the diagrammatic representation in FIG. 3.

This field $A1_{100}$ to be generated has the correct position vertically and with respect to time as compared with the field A1 of the original picture signal. Therefore, only a noise reduction should be carried out, and a line flicker reduction in particular is not necessary.

The output signals of the field memories 1 and 2 are utilized for the noise reduction, while it is advantageous to submit the field read from the field memory 2 and not having the correct position with respect to time as compared with the field $A1_{100}$ to be generated to a motion compensation of its picture contents. The motion vector determined by the motion compensation arrangement 5 in accordance with FIG. 1 is utilized for this purpose. This motion vector is denoted by $v_x$ in FIG. 3.

For a pixel marked in picture line 3 of the field $A1_{100}$ in FIG. 3, the pixel of the same line position and the same line number of the field $A1_{100}$, as read from the field memory 1, is utilized. Moreover, the pixel of the field $B0_{NR}$ as read from the second field memory and offset by the motion vector $v_x$ is used. This pixel is taken from line 4. A noise-reduced signal is obtained from these two pixels of the two fields. A factor k is provided for this purpose, indicating the degree of noise reduction. The pixel from the field A1 is multiplied by a factor 1-k and the pixel from the field $B0_{NR}$ is multiplied by a factor k. These two multiplied values are added and constitute the value of the marked pixel of the field $A1_{100}$.

If k is chosen to be small, only a small or no noise reduction is to be performed and this pixel is essentially obtained from the corresponding pixel of the field A1. With a larger factor k, the value of the pixel is increasingly being taken from the field $B0_{NR}$.

The generated field $A1_{100}$ thus corresponds to the field A1 of the original picture signal, but for the performed noise reduction. It is written into the second field memory 2 of FIG. 1 and is available as $A1_{NR}$ for subsequent fields to be generated.

During the generation of the first field $A1_{100}$ the multiplexer 8 is switched to its first input in accordance with FIG. 1, because the output signals for the noise reduction are used as output signals in accordance with the diagrammatic representation in FIG. 3 and hence as signals for the field $A1_{100}$.

Figure 4:
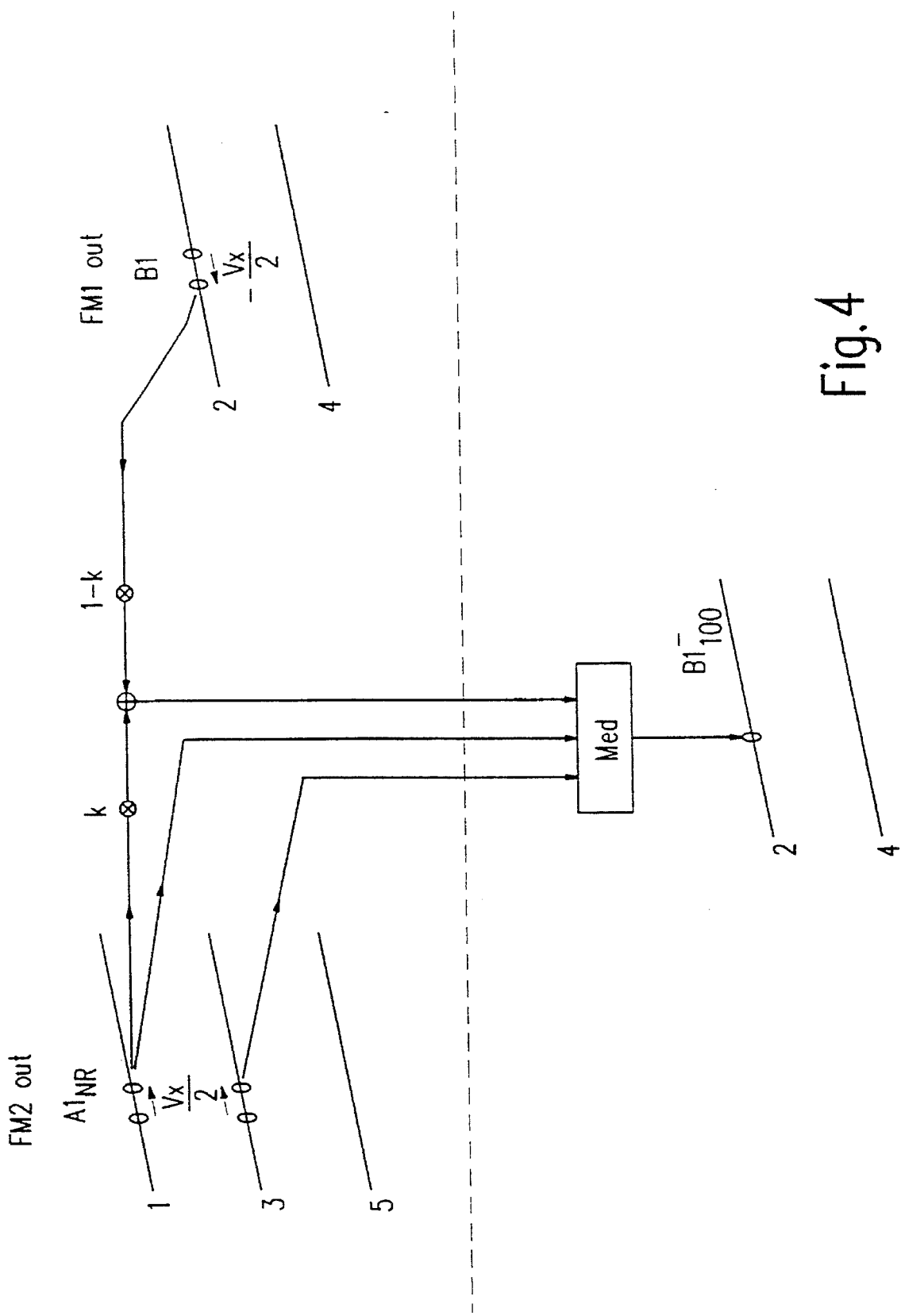
FIG. 4 is a representation, corresponding to FIG. 3, of the second field of the sequence.

FIG. 4 is a representation, corresponding to FIG. 3, for obtaining the second field $B1^-_{100}$ of the sequence.

As compared with the two fields of the original picture signal, this second field of the sequence neither has a vertically correct position nor a correct position as regards time. Therefore, a motion compensation and a line flicker reduction are performed.

At the instant of generating this second field, the field B1 of the original picture signal is read from the first field memory and the field A1 of the original picture signal is read in a noise-reduced form from the second field memory.

In the representation in FIG. 4 a pixel of the picture line 2 is marked for the field $B1^-_{100}$. The value of this pixel is generated from three values by means of median filtering, which values are obtained from the fields $A1_{NR}$ and B1.

The first of these values is obtained from the picture line 3 for that pixel which, after being offset by half the motion vector ($v_x.\frac{1}{2}$) has the same position as the pixel to be generated in the field $B1^-_{100}$. The second input signal of the median filter is obtained from the pixel of the same line position of line 1 of the field $A1_{NR}$. The value of this pixel is also multiplied by a factor k. Moreover, that pixel of the picture line 2 of the field B1 which, after use of half the negative motion vector ($-v_x.\frac{1}{2}$) has the same picture line position as the pixel to be generated of the field $B1^-_{100}$ is multiplied by a factor 1-k. These two values are added and the sum constitutes the third input signal for the median filtering. Due to the median filtering, the input signal having the middle instantaneous amplitude value is selected from these three input signals. This signal is constituted by the value of the marked pixel of the second field $B1^-_{100}$ of the sequence.

As already shown in the representation according to FIG. 4, a motion compensation for all signals is required for this field. Moreover, a line flicker reduction is to be performed. Consequently, the multiplexer 8 is switched to its second input for generating the value of the field $B1^-_{100}$ in accordance with the representation in FIG. 1, which input receives the output signal from the line flicker reduction arrangement 7.

Figure 5:
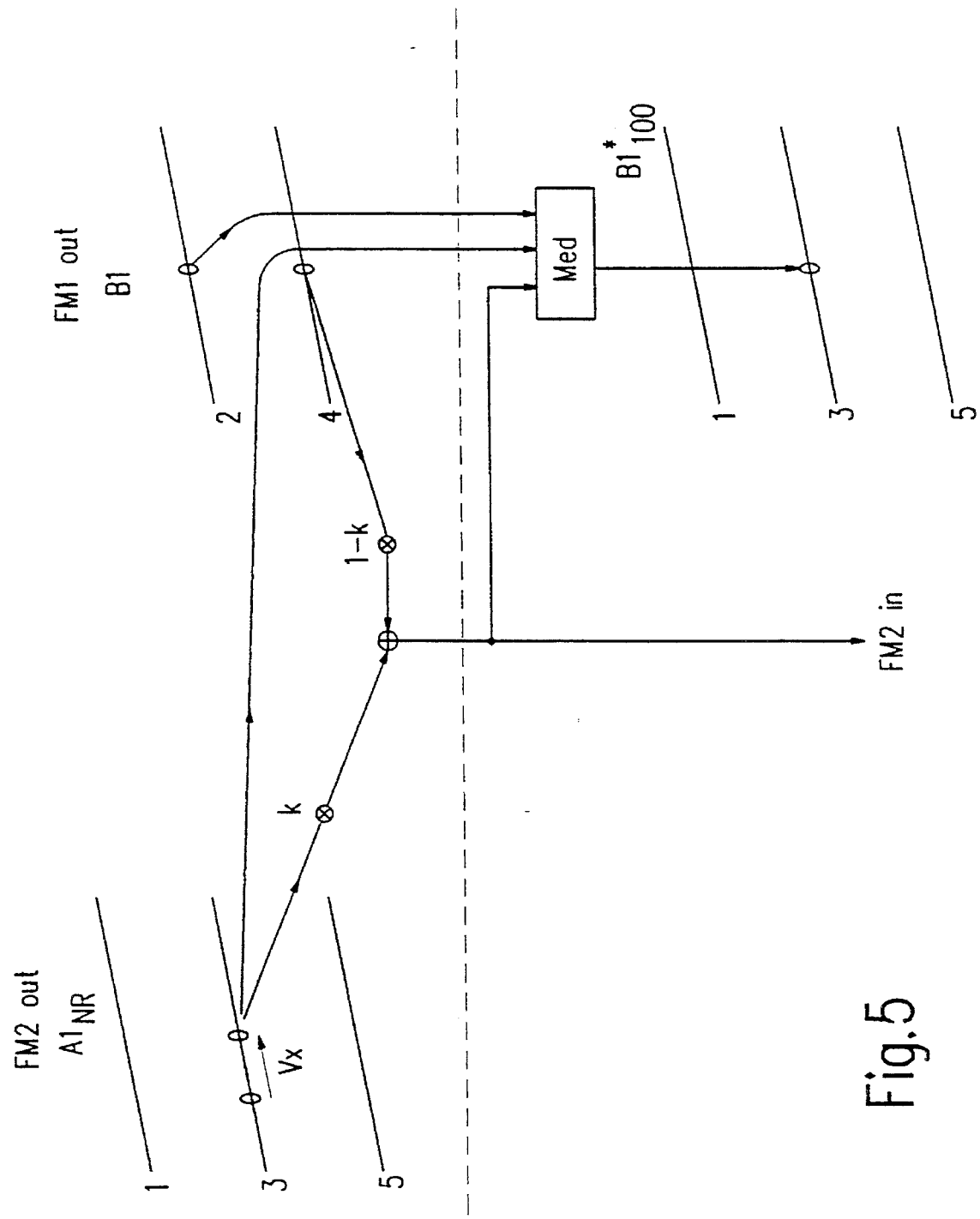
FIG. 5 is a representation, corresponding to FIG. 3, of the third field of the sequence.

FIG. 5 is a representation corresponding to FIGS. 3 and 4, but in the representation according to FIG. 5 the third field $B1^*_{100}$ of the sequence is to be generated.

The two corresponding fields A1 and B1 of the original picture signal are used again for generating this field. The field B1 is read from the field memory 1 of FIG. 1. The field A1, which is already noise-reduced, is read from the field memory 2 of FIG. 1.

A median filtering is performed again, because the output field B1 has the incorrect vertical position. The output field $A1_{NR}$ additionally has the incorrect position with respect to time so that also a motion compensation has to be performed for this field.

A median filtering of three input signals is carried out for generating one of the pixels marked in FIG. 5, of the picture line 3 of the field $B1^*_{100}$.

The first of these input signals represents the value of the pixel of the picture line 2 of the field B1, which has the same picture line position in its picture line as the pixel to be generated in its picture line. Moreover, from the field A1, as read from the second field memory, that pixel is used which after correction by the motion vector $v_x$ has the same line position as the pixel to be generated. This motion-compensated pixel represents the second input signal of the median filter. The third input signal is formed by the sum of the value of the same line position of the pixel of the picture line 4 of the field B1, multiplied by a factor 1-k, and the value of the second input signal of the median filter, multiplied by a factor k. This sum represents the third input signal of the median filter and is simultaneously written as input signal into the second field memory from which it can be read again for fields to be subsequently generated.

The multiplexer 8 of the block diagram in FIG. 1 is switched to its second input for generating the third field $B1^*_{100}$ of the sequence, because a line flicker reduction as well as a motion compensation have to be performed.

In FIG. 6, corresponding to the representations in FIGS. 3 to 5, the values of the fourth field $B1^+_{100}$ of the sequence are to be obtained.

Since the field B1 used for this purpose (in a noise-reduced form) of the original picture signal has the correct vertical position, i.e. the same position as the field $B1^+_{100}$, a line flicker reduction is not necessary in this case. The field $B1_{NR}$ has, however, the incorrect position with respect to time so that a motion compensation is necessary.

Consequently, for a pixel as marked by way of example in FIG. 6 in picture line 2 in a given position, that pixel of the field $B1_{NR}$ as read from the field memory 2 is used which has the same line position as the pixel to be generated in its picture line after correction by half the motion vector ($v_x.\frac{1}{2}$).

Since only a motion compensation (in addition to noise reduction) is necessary in this case, the multiplexer 8 of FIG. 1 is switched to its third input.

The way of generating a sequence of four fields in accordance with FIGS. 3 to 6 is continuously repeated, with four corresponding fields of the converted picture signal being obtained for two output fields of the original picture signal.

We claim:

1. A system for converting an original picture signal representing a sequence of frames, each of which is composed of two interlaced fields, into a converted picture signal which has a double field frequency with respect to the original picture signal, comprising: a memory for doubling each field of the original picture signal, a motion compensation circuit receiving an output signal from the memory, a noise reduction circuit receiving an output signal from the motion compensation circuit, a line flicker reduction circuit receiving output signals from the noise reduction circuit and the motion compensation circuit and a multiplexer for generating a converted picture signal that is obtained from the output signals of the noise reduction circuit, the line flicker reduction circuit or the motion compensation circuit, dependent on position with respect to time of each field to be generated of the converted picture signal with respect to the original picture signal.

2. The system as claimed in claim 1, wherein said memory comprises a first field memory, the original picture signal being written into the first field memory and read from the first field memory at a double field frequency, each field being consecutively read twice, and wherein said system comprises a second field memory into which each field read for the second time from the first field memory is written after said each field read for the second time has passed through the noise reduction circuit.

3. The system as claimed in claim 2, wherein the first and second field memories precede a line memory which buffers a picture line of one of the output signals of the first and second field memories.

4. The system as claimed in claim 1, wherein the line flicker reduction circuit comprises a median filter receiving three input signals each having an amplitude values, one of the input signals having an amplitude value between the other two amplitude values, the median filter supplying as an output signal the one input signal.

5. The system as claimed in claim 3, wherein the motion compensation circuit receives the output signals of the first and second field memories and the line memory, and in that the motion compensation circuit determines a motion vector from two consecutive fields of the original picture signal read from the field memories, said motion vector indicating motion between the two fields for a group of pixels of these fields.

6. The system as claimed in claim 2, wherein the line flicker reduction circuit is a median filter receiving three input signals each having an amplitude values, one of the input signals having an amplitude value between the other two amplitude values, the median filter supplying as an output signal the one input signal.

7. The system as claimed in claim 3, wherein the line flicker reduction circuit is a median filter receiving three input signals each having an amplitude values, one of the input signals having an amplitude value between the other two amplitude values, the median filter supplying as an output signal the one input signal.

8. The system as claimed in claim 5, wherein the multiplexer generates a sequence of four fields of the converted picture signal corresponding to two fields of a frame of the original picture signal, a first field of the sequence being obtained from the output signal of the noise reduction circuit, a second and a third field of the sequence being obtained from the output signal of the line flicker reduction circuit, and a fourth field of the sequence being obtained from the output signal of the motion compensation circuit.

9. A system for converting an original picture signal representing a sequence of frames, each of which is composed of two interlaced fields, into a converted picture signal which has a double field frequency with respect to the original picture signal, comprising: a memory for doubling each field of the original picture signal, a motion compensation circuit receiving an output signal from the memory, a noise reduction circuit receiving an output signal from the motion compensation circuit, a line flicker reduction circuit receiving output signals from the noise reduction circuit and the motion compensation circuit and a multiplexer for generating a converted picture signal that is obtained from the output signals of the noise reduction circuit, the line flicker reduction circuit or the motion compensation circuit, dependent on position with respect to time of each field to be generated of the converted picture signal with respect to the original picture signal, wherein the multiplexer generates a sequence of four fields of the converted picture signal corresponding to two fields of a frame of the original picture signal, a first field of the sequence being obtained from the output signal of the noise reduction circuit, a second and a third field of the sequence being obtained from the output signal of the line flicker reduction circuit, and a fourth field of the sequence being obtained from the output signal of the motion compensation circuit.

10. The system as claimed in claim 9, wherein in generating the first field of the sequence, the multiplexer obtains a value of each pixel of a line position x in a picture line y by addition of a value, multiplied by a factor k, of a pixel of a line position $x-v_x$ in a line y+1 of a last field of the original picture signal transmitted before a corresponding frame of the original picture signal, and a value, multiplied by a factor 1-k, of a pixel of the line position x of the picture line y of a first field of the corresponding frame of the original picture signal, the value $v_x$ being a motion vector supplied by the motion compensation circuit and the value k determining a measure of noise reduction.

11. The system as claimed in claim 9, wherein in generating the second field of the sequence, the multiplexer obtains a value of each pixel of a line position x in a picture line y by median filtering from a value of a pixel of a line position $x+(v_x \cdot \frac{1}{2})$ in a line y+1 of a first field of a corresponding frame of the original picture signal, a value of a pixel of the line position $x+(v_x \cdot \frac{1}{2})$ in a line y+1 of the first field of the corresponding frame of the original picture signal, and a value of a sum of a value, multiplied by a factor k, of a pixel of the line position $x+(v_x \cdot \frac{1}{2})$ in the line y−1 of the first field of the corresponding frame of the original picture signal and a value, multiplied by a factor 1-k, of a pixel of a line position $x-(v_x \cdot \frac{1}{2})$ in the line y of a second field of the corresponding frame of the original picture signal, the value $v_x$ being a motion vector supplied by the motion compensation circuit and the value k indicating a measure of noise reduction.

12. The system as claimed in claim 9, wherein in generating the third field of the sequence, the multiplexer obtains a value of each pixel of a line position x in a picture line y by median filtering from a value of a pixel of a line position $x+v_x$ in the line y of a first field of the corresponding frame of the original picture signal, a value of a pixel of the line position x in a line y−1 of a second field of the corresponding frame of the original picture signal, and a value of a sum of a value, multiplied by a factor k, of pixel of the line position $x+v_x$ in the line y of the first field of the corresponding frame and a value, multiplied by a factor 1-k, of a pixel of the line position x in a line y+1 of the second field of the corresponding frame of the original picture signal, the value $v_x$ being a motion vector supplied by the motion compensation circuit and the value k determining a measure of noise reduction.

13. The system as claimed in claim 9, wherein in generating the fourth field of the sequence, the multiplexer obtains a value of each pixel of a line position x in a picture line y from a value of a pixel of a line position $x+(v_x \cdot \frac{1}{2})$ of the line y of a second field of a corresponding frame of the original picture signal, the value $v_x$ being a motion vector supplied by the motion compensation circuit.

\* \* \* \* \*